United States Patent
Waldbaum et al.

(10) Patent No.: US 10,360,049 B2
(45) Date of Patent: Jul. 23, 2019

(54) EXTENSIBLE TEMPLATE PIPELINE FOR WEB APPLICATIONS

(71) Applicant: MICROSOFT TECHNOLOGY LICENSING, LLC, Redmond, WA (US)

(72) Inventors: Brett Waldbaum, Sammamish, WA (US); Caitlin Kehoe Hart, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 11 days.

(21) Appl. No.: 15/826,009

(22) Filed: Nov. 29, 2017

(65) Prior Publication Data

US 2018/0113722 A1    Apr. 26, 2018

Related U.S. Application Data

(63) Continuation of application No. 12/968,572, filed on Dec. 15, 2010, now Pat. No. 9,864,611.

(51) Int. Cl.
G06F 9/44    (2018.01)
G06F 9/451   (2018.01)

(52) U.S. Cl.
CPC .................. G06F 9/454 (2018.02)

(58) Field of Classification Search
CPC ...................................... G06F 9/4448
See application file for complete search history.

(56) References Cited

U.S. PATENT DOCUMENTS

| 7,441,184 | B2 * | 10/2008 | Frerebeau ............. G06F 17/272 715/234 |
| 7,747,941 | B2 | 6/2010 | Campbell et al. |
| 7,797,151 | B2 * | 9/2010 | Apte ....................... G06F 9/454 704/8 |
| 2002/0123878 | A1 * | 9/2002 | Menke ................ G06F 17/2229 704/2 |
| 2005/0038822 | A1 * | 2/2005 | Bijaoui ................. G06F 17/271 |
| 2006/0294199 | A1 * | 12/2006 | Bertholf ............ G06F 17/30893 709/217 |

FOREIGN PATENT DOCUMENTS

CN    1555534    12/2004

OTHER PUBLICATIONS

CN First Office Action for Application No. 201110420208.5, dated Jan. 6, 2014, 8 Pages.
(Continued)

*Primary Examiner* — Umut Onat

(57) ABSTRACT

Systems and methods are provided for modifying webpages. In some embodiments, a computer-implemented system can include: an authoring component configured to generate and output a file of metadata indicating contents for a new webpage and specifying a template for the new webpage. The system also includes a transformer component configured to receive the file of metadata indicating contents for the new webpage and specifying the template, and merge, with the template, the file of metadata. The transformer component is also configured to automatically generate a file describing the new webpage, wherein the new webpage is based, at least, on the contents for the new webpage and the template.

20 Claims, 11 Drawing Sheets

(56) References Cited

OTHER PUBLICATIONS

CN Search Report for Application No. 201110420208.5, dated Dec. 24, 2013.
Glover, "Getting Started with Localizer for asp.net", TMG Development Ltd, Jun. 19, 2003.
CN Second Office Action for Application No. 201110420208.5, dated Jul. 21, 2014.
"Getting Started with Localizer for asp.net" by TMG Development Ltd., published 2003 (http://www.winformreports.co.uk/localizeUntro_howto.htm; hereinafter "Localizer").
"Live Clipboard—Wiring the Web", retrieved Dec. 15, 2010 from http://www.liveclipboard.org. 1 page "This reference was previously filed on Dec. 15, 2010".
"Notice of Allowance Issued in U.S. Appl. No. 12/968,572", dated Sep. 21, 2017, 7 Pages.
"Final Office Action Issued in U.S. Appl. No. 12/968,572", dated May 8, 2014, 20 Pages.
"Final Office Action Issued in U.S. Appl. No. 12/968,572", dated Feb. 26, 2015, 21 Pages.
"Final Office Action Issued in U.S. Appl. No. 12/968,572", dated Aug. 7, 2013, 20 Pages.
"Non-Final Office Action Issued in U.S. Appl. No. 12/968,572", dated Dec. 5, 2013, 20 Pages.
"Non-Final Office Action Issued in U.S. Appl. No. 12/968,572", dated Jan. 31, 2013, 19 pages.
"Non-Final Office Action Issued in U.S. Appl. No. 12/968,572", dated Sep. 30, 2014, 20 Pages.
"Notice of Allowance Issued in U.S. Appl. No. 12/968,572", dated Sep. 8, 2017, 7 Pages.
"Final Office Action Issued in Chinese Patent Application No. 201110420208.5", dated Feb. 19, 2016, 6 Pages. (W/o English Translation).
"Fourth Office Action Issued in Chinese Patent Application No. 201110420208.5", dated Aug. 3, 2015, 9 Pages.
"Notice of Re-examination Issued in Chinese Patent Application No. 201110420208.5", dated Sep. 27, 2016, 12 Pages.
"Third Office Action Issued in Chinese Patent Application No. 201110420208.5", dated Feb. 11, 2015, 7 Pages.

* cited by examiner

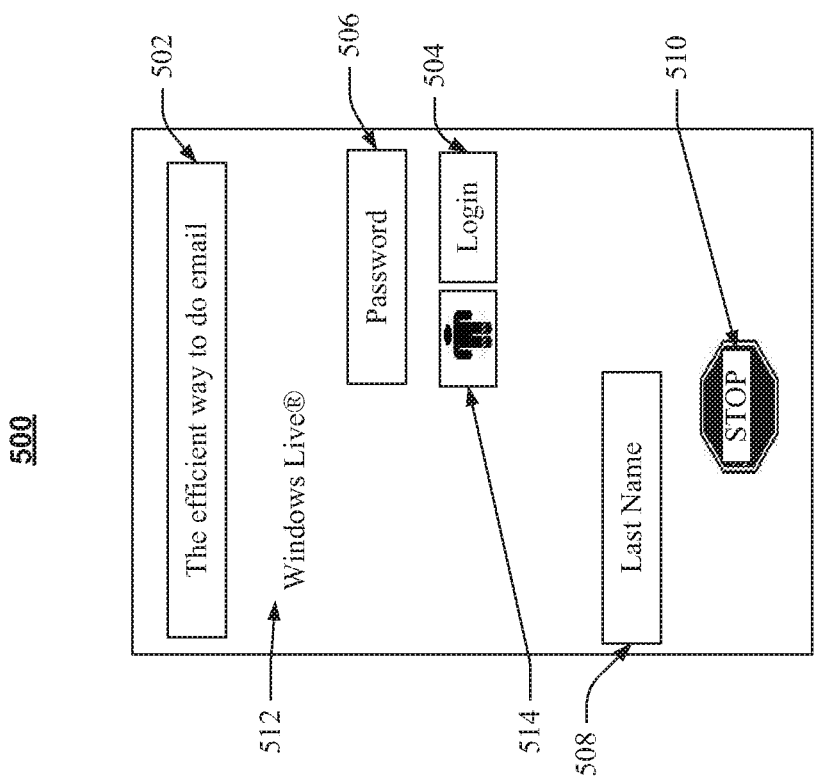

EXTENSIBLE TEMPLATE PIPELINE FOR WEB APPLICATIONS

RELATED APPLICATIONS

This Application is a Continuation of, and claims benefit from or priority of U.S. patent application Ser. No. 12/968,572 that was filed on Dec. 15, 2010, which is now U.S. Pat. No. 9,864,611, issued on Jan. 9, 2018, and that is incorporated herein by reference in its entirety.

TECHNICAL FIELD

The subject disclosure relates to web applications, generally, and more to facilitating extensible template pipelines for web applications, specifically.

BACKGROUND

To modify the appearance of a web application after an operating system (OS) has been finalized and released to the public, the user interface (UI) webpages for the web application may need to be modified. Conventional systems provide no pipeline or process to easily modify these webpages in an extensible and easily updatable way. Further, there is no known way for an external content editor to edit webpages of these web applications. As such, editing is often quite cumbersome and not easily adaptable to the specific purposes and/or branding desired by third-parties.

Additionally, to localize a UI into another language from the language in which the UI is originally provided, conventional systems require webpages of the UI to be completely re-written in the new localized language. However, completely re-writing a webpage is typically time-consuming and error-prone. Frameworks exist that allow editors to create localizable resource files in compiled code (e.g., C++ and C#) but these frameworks do not provide a process that enables localization for UI elements for webpages in web applications. Further, there are no known approaches that enable merging localized strings or images with a webpage at authoring time (as conventional solutions perform merging operations at run-time). Limiting merging operations to run-time is typically inefficient.

Additionally, the localizable element of the webpage can be modified using the ASP.NET™ web application framework. However, for static web pages that are not retrieved from a web server via the ASP.NET™ framework, there is no known way to modify only the localizable element of the webpage.

For at least the above reasons, systems, methods and computer-readable storage media that facilitate web application modification are desired.

SUMMARY

A simplified summary is provided herein to help enable a basic or general understanding of various aspects of one or more of the exemplary, non-limiting embodiments that follow in the more detailed description and the accompanying drawings. This summary is not intended, however, as an extensive or exhaustive overview. Further, this summary is not intended to identify key features or essential features of the claimed subject matter, nor is it intended to be used to limit the scope of the claimed subject matter. Finally, the claimed subject matter is not limited to implementations that solve any or all of the noted disadvantages discussed in the Background. Instead, the sole purpose of this summary is to present some concepts related to some exemplary non-limiting embodiments in a simplified form as a prelude to the more detailed description of the various embodiments that follow.

In one non-limiting embodiment, a computer-implemented system is provided. The system includes an authoring component (AC) that is configured to generate a file of metadata that indicates contents for a new webpage, and that specifies a template for the new webpage. The system also includes a transformer component (TC) configured to receive the file of metadata and merge the template with the file of metadata. As such, merging is performed at the time of authoring the webpage as opposed to run-time, in some embodiments. The TC automatically generates a file describing the new webpage. In some non-limiting embodiments, the metadata is also about controls to be displayed with the template and/or branding or advertising to be displayed on the new webpage.

In some alternative embodiments, the system also includes a validation component configured to validate parameters of the file of metadata. In some non-limiting embodiments, the validation is of text string length, image information, controls to be displayed with the templates of the webpage, the suitability of the templates to the webpage and/or the suitability of the controls to the templates.

In some alternative embodiments, the AC and TC have additional capability. The AC is further configured to identify localizable elements of a webpage. In one embodiment, identifying the localizable elements includes distinguishing the localizable elements from the non-localizable elements. After identifying these localizable elements, the authoring component outputs information indicating the localizable elements to the transformer component, and the transformer component is further configured to merge the information about the webpage with the information output from the authoring component (e.g., the information indicating the localizable elements).

In another non-limiting embodiment, a computer-implemented method is provided. In one embodiment, the method includes receiving a file including metadata describing a requested webpage and specifying a template for the requested webpage, and one or more controls to display with the template. In one embodiment, the metadata describes applications for display on the requested webpage and branding or advertising corresponding to the one or more applications. The method also includes merging the file with the template and generating the requested webpage. In one embodiment, at least one of the applications is an online marketplace.

Additionally, in another non-limiting embodiment, the method also includes identifying localizable elements of the requested webpage, and outputting information indicating the localizable elements via an external web portal.

For example, identifying localizable elements includes, in one embodiment, determining whether elements of the requested webpage are text strings or images containing text.

In another embodiment, a computer-readable storage medium is provided. The computer-readable storage medium includes instructions stored thereon that, when executed by a processor, cause a method to be performed. In some embodiments, the method includes receiving information describing a requested webpage. Non-localizable elements of the information and localizable elements of the information are then identified. In one embodiment, the localizable elements are text suitable for translation into a language corresponding to a locale for the requested webpage. For example, for the France locale, localization means translation into French.

The method also includes generating a first file including the non-localizable elements of the information and generating a second file including the localizable elements of the information. In some cases, the method also includes localizing the localizable elements of the second file based, at least, on the locale, and generating the requested webpage. The requested webpage is generated, in some embodiments, after inserting localized elements into placeholders in the requested webpage.

These and other embodiments are described in more detail below.

BRIEF DESCRIPTION OF THE DRAWINGS

Various non-limiting embodiments are further described with reference to the accompanying drawings in which:

FIG. 5 is a block diagram illustrating an exemplary non-limiting embodiment of a display region of a UI providing editable fields for facilitating web application modification in accordance with various aspects and embodiments described herein;

DETAILED DESCRIPTION

Figure 1:
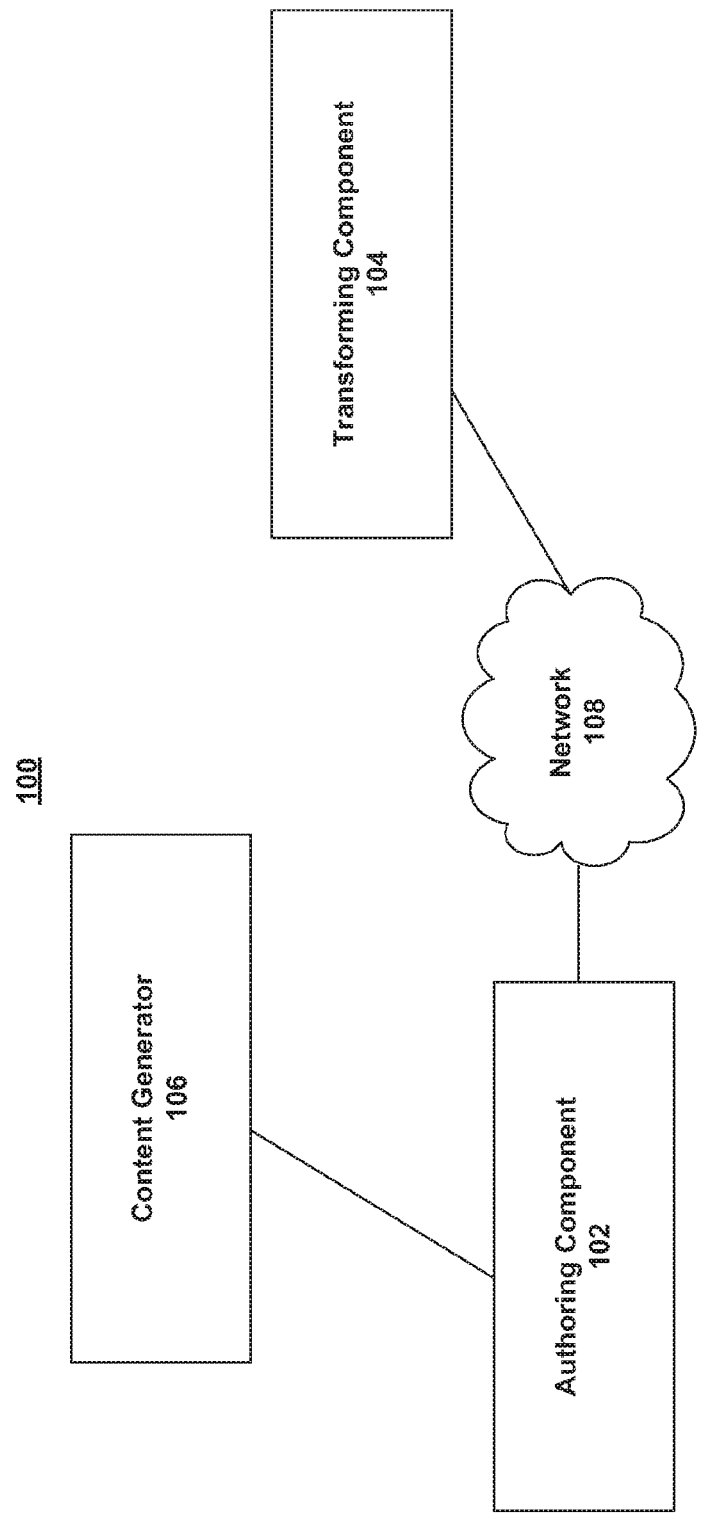
FIG. 1 is a block diagram illustrating an exemplary non-limiting system that facilitates web application modification in accordance with various aspects and embodiments described herein.

Certain illustrative embodiments are described herein in the following description and the annexed drawings. These embodiments are merely exemplary, non-limiting and non-exhaustive. As such, all modifications, alterations, and variations within the spirit of the embodiments is envisaged and intended to be covered herein.

As used in this application, the terms "component," "component," "system," "interface," and the like, are generally intended to refer to hardware and/or software or software in execution. For example, a component can be, but is not limited to being, a process running on a processor, a processor, an object, an executable, a thread of execution, a program and/or a computer. By way of illustration, both an application running on a controller and the controller can be a component. One or more components can reside within a process and/or thread of execution and a component can be localized on one computer and/or distributed between two or more computers. As another example, an interface can include input/output (I/O) components as well as associated processor, application and/or application programming interface (API) components, and can be as simple as a command line or as complex as an Integrated Development Environment (IDE). Also, these components can execute from various computer-readable media and/or computer-readable storage media having various data structures stored thereon.

Embodiments described herein include systems and methods for facilitating extensible pipelines for modifying web applications. For example, one system includes an AC that generates a file of metadata describing contents for, and specifying a template for, a new webpage. The system also includes a TC that generates a HyperText Markup Language (HTML) file that is created with contents based on merging the information specified by the metadata with the template. The HTML file can then be downloaded by a client machine and the new, modified webpage provided to the end user. Controls to be displayed on the template, and/or branding or advertising are also specified in some embodiments, and the corresponding new webpage also provides such controls.

In another system, the AC is configured to receive a webpage and automatically identify localizable elements of the webpage by placing such elements in a file that is separate from the file including the non-localizable elements. The file of localizable elements is then localized (e.g., translated into a language corresponding to the locale for the region in which the web page will be viewed) and the localized content is then inserted into the main page source code for the webpage. In some embodiments, the localizable elements, once identified, are output to a web portal accessible by external editors. The editors can then localize the localizable elements.

The above are exemplary, non-limiting descriptions of the embodiments described herein. Additional or alternative embodiments will be described below with reference to the figures.

Turning to the figures, FIG. 1 is a block diagram illustrating an exemplary non-limiting system facilitating web application modification in accordance with various aspects and embodiments described herein. In one non-limiting embodiment, the system 100 includes an AC 102, a TC 104, a network (e.g., Internet) 108 and a content generator 106.

In embodiments described herein, the content generator 106 outputs to the AC 102 information indicating a desired appearance of an updated webpage. The AC 102 generates metadata regarding the contents of a webpage. In various embodiments, the contents can include information including, but not limited to, controls, templates, advertising and/or branding for the webpage. The TC 104 receives the metadata and outputs a file for downloading by a client.

In some embodiments, the content generator 106 provides metadata for a webpage that the content generator 106 would like to localize to a language (e.g., English, French, Korean). The metadata is utilized to identify elements of the webpage that will be localized, and localization can be done for the locale that the content generator 106 is serving. In one embodiment, the content generator 106 inputs text strings in a particular language (e.g., English language), into the AC 102, and then receives back a list of strings in a file. The strings are localizable elements of the webpage in some embodiments. The strings are then edited (e.g., localized to the locale) by the content generator 106.

As used herein, localizing to a language means providing text in a particular language. For example, localizing to French means providing text in French. Localizing to Spanish means providing text in Spanish.

In some embodiments, at the discretion of the system designer, the system is designed such that the AC 102 does not return a file of editable strings. Instead, the AC 102 returns a UI with editable fields such as that described below with reference to FIG. 5. In other embodiments, also at the discretion of the system designer, the UI returned does not only contain editable fields (allowing only certain fields to be edited), rather, the UI returns the entire web page (allowing the entire webpage to be edited).

The AC 102 and TC 104 are now discussed in detail with reference to FIGS. 1, 2, 4A and/or 4B. As such, in different alternative embodiments, the AC 102 has one or more of the functions of AC 200 and the TC 104 has one or more functions of the TC 410.

Figure 2:
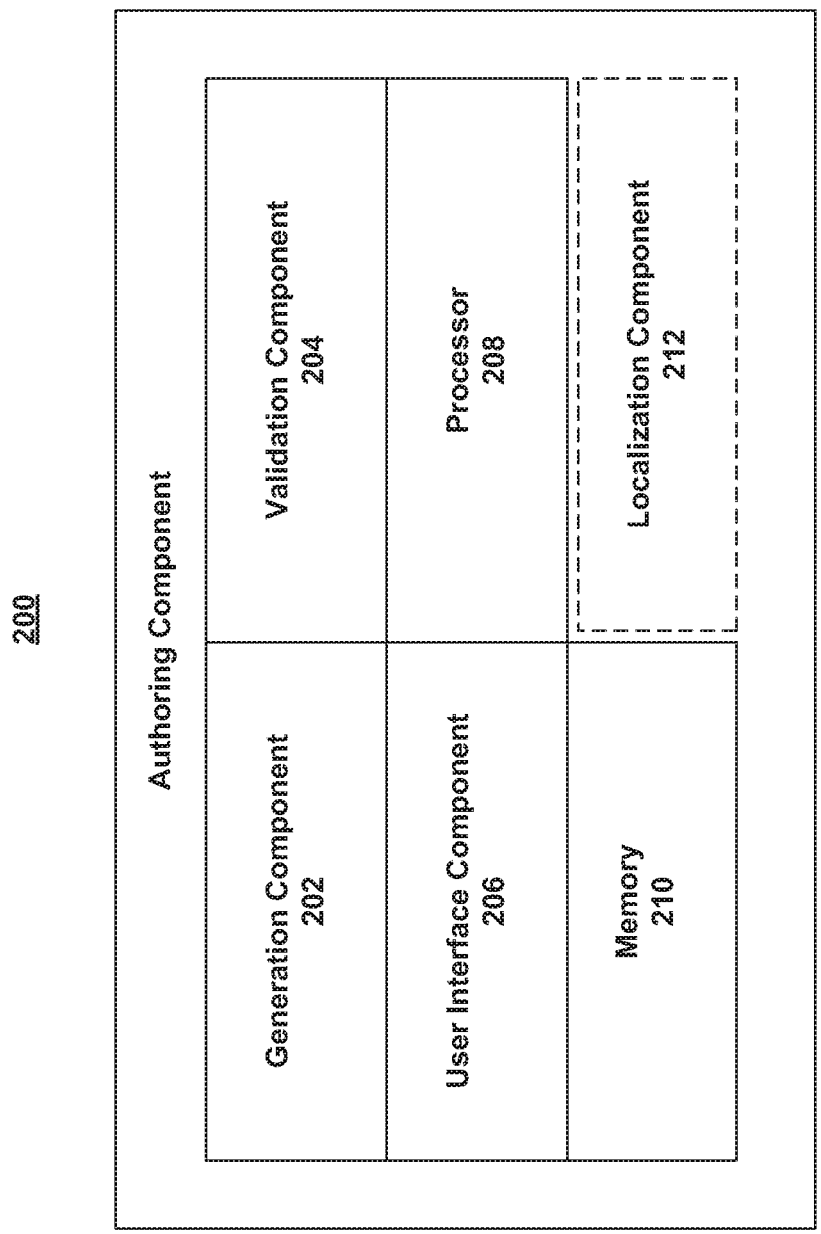
FIG. 2 is a block diagram illustrating an exemplary non-limiting AC that facilitates web application modification in accordance with various aspects and embodiments described herein.

Turning now to FIG. 2, as shown, the AC 200 includes a generation component 202, a validation component 204, a UI component 206, a processor 208 and/or a memory 210. The generation component 202, validation component 204, UI component 206, processor 208 and/or a memory 210 are communicatively coupled to one another for performing one or more of the AC 200 functions described herein. In various embodiments, the AC 200 is a website, web portal or a computer program configured to generate one or more extensible markup language (XML) files for use by the TC 104 to modify the web application. In various embodiments, the AC 200 is automated or computer-driven.

The generation component 202 is configured to generate page definition files that contain metadata about the contents of a webpage. In various embodiments, the page definition files are XML files.

In various alternative embodiments, the metadata describes information indicating a reference to a template to employ on the webpage, styling information about the referenced template, information indicating controls to appear in the container of the referenced template and/or branding or advertising information that typically appear on the webpage.

Turning back to FIG. 2, the validation component 208 is configured to validate the parameters of (e.g., metadata of) the page definition file. In some embodiments, the validation component 208 validates the parameters based on rules and/or policies associated with the editable fields of the schema for the page definition file.

One example of the validation component 208 validating parameters based on rules and/or policies is validating information at a section of a webpage based on a rule noting a maximum and a minimum length of a string of characters. The AC 200 applies the maximum and minimum limits to such section and denies edits to the webpage that violate the length rules for the section. For example, the title of a webpage has a previously known maximum number string length and minimum string length. Upon identifying an edit to add another character beyond the maximum string length, the validation component 208 returns an error message. In some embodiments, the AC 200 then denies the edit.

Another example of the validation component 208 validating parameters based on rules and/or policies is validating information at a section of a webpage based on a rule and/or policy resultant from or related to a previously determined agreement between the parties designing the AC 200 and the TC 104. For example, the rule can be that the AC 200 and the TC 104 validate the specific information identified in the agreement between the parties. However, in some embodiments, the agreement can be that the TC 104 operates on a trust basis with the AC 200 and does not validate information that the AC 200 typically validates.

As such, in these embodiments, the rules and/or policies used for validating by the validation component 208 are pre-programmed into the validation component 208. For example, the rules and policies can specify certain fields (or types of fields) that can be edited (or that cannot be edited).

In some embodiments, however, rules and/or policies are not pre-programmed into the validation component 208 and are instead automatically generated on-the-fly based at least on the information provided in the schema and/or heuristics extracted from the input metadata.

In various other embodiments, the parameters that are validated can include, but are not limited to, a text string length, information associated with an image, controls to be displayed with the templates of the webpage, the suitability of the templates to the webpage, the suitability of the controls to the templates, a number of strings or applications for a particular one of the one or more controls.

In some embodiments, for images, the information associated with the image that can be validated includes whether the image is black and white or a color image, a type of the image, a content of the image and/or a size of the image. In various embodiments, other information is specified about an image in the AC 200 (and/or validation component 208) and the AC 200 (and/or validation component 208) enforces such rules or policies.

The generation component 202 is configured to format advertising and/or branding information for the webpage. In one non-limiting embodiment, the generation component 202 formats the advertising and/or branding information based, at least, on the input received from the external editors. The generation component 202 formats the advertising and/or branding information in any number of methods including, but not limited to, based on preexisting agreements that may be in place with regard to the web application for the web page and/or based on the demographics of users that tend to frequent the web page or the like. The generation component 202 generates corresponding metadata describing the advertising and/or branding information for inclusion on the webpage.

The UI component 206 controls a UI of the AC 200 to display information to an external editor. In one non-limiting embodiment, the external editor is located external from the AC 200. The UI is a graphical user interface (GUI) in some embodiments. In some embodiments, the UI is configured to receive inputs from the webpage author and display information to the external editor. The UI is configured to enable external editors to create a list of applications for the specified control and/or to selectively override application images, in some embodiments.

In some alternative embodiments, the AC 200 also includes a localization component 212. The localization component 212 is employed in embodiments of the AC 200 in which automatic identification of localizable elements of a webpage is desired. Localizable elements are those that can be modified to reflect locale-specific information. For example, elements that can be modified to be shown in a certain language are localizable. By way of example, text strings are localizable and the text portion of images are localizable. The identification is desired so that only the localizable elements are modified. As shown in FIG. 2, the localization component 212 is an optional component of the AC 200 and is not provided in all embodiments.

The localization component 212 automatically identifies the localizable elements. As such, the localizable elements are distinguished from the non-localizable elements. The localizable elements are returned in a file in some embodiments, or displayed via a UI display.

The localization component 212 identifies the fields of the metadata that can be localized. In other embodiments, the style, branding, images, and/or advertisement on the page are localized.

In some embodiments, the fields of the metadata that can be localized are identified by the localization component 212 based, at least, on the definition of the XML schema. The XML schema has one or more designated localizable elements and non-localizable elements. As such, in some embodiments, for each schema, the elements that are localizable are predefined.

In some alternative embodiments, the localization component 212 infers the elements that are localizable as such elements are not predefined. For example, elements that are exposed to a viewer of the web application, including, text strings or image source or images, are inferred as localizable. Any elements that might be language-specific are inferred as localizable. Examples of language include, but are not limited to, English, German and Japanese. However, in some embodiments, trademarks and other indicia that comprise intellectual property (e.g., copyright protected elements of the webpage) are inferred as non-localizable so that such information is not modified.

In some embodiments, the localization component 212 identifies the element of the metadata that is localized in a number of different ways. For example, in some embodiments, the localization component 212 identifies the element of the metadata that is localized by evaluating the type of the information in the metadata. The localization component 212 searches for and identifies text strings and/or images and/or lists of applications in the metadata.

The generation component 202 generates an XML file of the localizable metadata and output the XML file from the AC 200 to an external editor. The file is employed to allow localization of strings into other languages from the languages in which the strings were initially provided. The file is input to the TC 104 along with the page definition to create a localized HTML webpage.

In some embodiments, the localization component 212 generates a customizable UI that contains editable fields corresponding to the localizable content. The AC 200 outputs the customizable UI to the webpage author for localization of the content into another language from the language in which the UI was first developed.

In some alternative embodiments, the AC 200 is configured to receive the localized content and the UI component 206 generates a UI in that locale (in that language into which the UI is localized) and the external editor need not have re-input all of the non-localizable content.

In one mere exemplary embodiment, the information for localization can be in a file as follows.

```
<?xml version="1.0"?>
<!-- File generated by Windows 8 Channel Partner Portal tool xyz.exe -->
<ABCLocFile partner="Microsoft" author="B.W."
version="1.0" id="7890">
    <loc>en-us</loc>
    <string id="1">Multiplayer Madness!</string>
    <string id="2">back to school</string>
</ABCLocFile>
```

The schema is as follows.
ABCLocFile—A top-level node that contains the following parameters:
partner="Microsoft" or the name of the channel partner who created the file author=person who created the file (requested by channel partner team for tracking)

version=represents the loc file schema version; for Win8 ® it is "1.0" and may be incremented in future releases id=specifies the unique identifier of the corresponding page def file, used to verify that this is the correct matching loc file loc—One node with an ABCLocFile parent node. It contains the locale, such as "en-us".

String—One or more nodes which contain the localized strings. It contains the attribute:

id=The string ID as referenced by the "##Sx##" placeholder in the page definition file In various embodiments, the processor 208 enables the AC 200 or TC 104 to perform one or more of the functions described herein. The processor 208 is configured to execute computer-executable instructions to perform one or more of the functions described herein for the AC 200 and/or TC 104, and the memory 210 stores the computer-executable instructions and/or information for performing the operations described herein.

Figure 3:
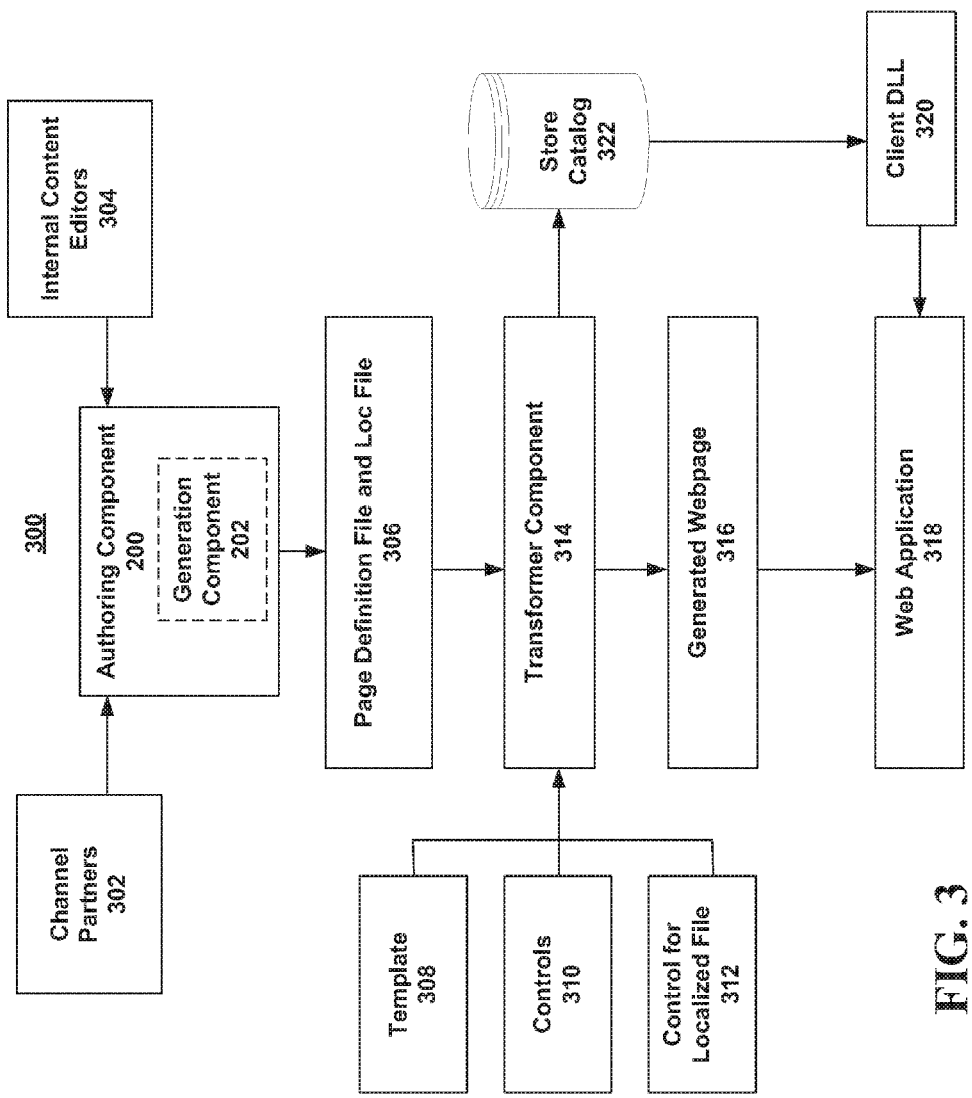
FIGS. 3, 4A and 4B are flow diagrams illustrating exemplary flows that facilitate web application modification in accordance with various aspects and embodiments described herein.

FIG. 3 is a flow diagram illustrating exemplary flows that facilitate web application modification in accordance with various aspects and embodiments described herein. As shown in FIG. 3, an AC (or channel partner portal) 200 receives metadata about the desired appearance of the webpage. The metadata is received from channel partners (e.g., external editors) 302 of the web application. In some embodiments, the AC 200 also receives information from internal content editors 304.

In various embodiments, the metadata includes information specifying a number of different types of information, including, but not limited to, templates for the webpage, controls to be displayed with the templates, lists of applications to be displayed with the templates, the market of interest for the web application, the locale for the web application, the partner name and/or the partner logo bitmap.

In some embodiments, the AC 200 is a website. AC 200 creates a page definition file 306. In some embodiments, the AC 200 also generates and outputs a Loc file, as shown in FIG. 3 at 306. The page definition file and the Loc file are XML files in various embodiments.

The AC 200 also invokes the TC 314 upon generating the page definition file and Loc file. The TC 314 receives the page definition file (and Loc file) and merges the files with template files 308 and controls files 310 for the templates. A controls file is a file that specifies information about the controls to be displayed with the template in some embodiments. Merging is performed at the time of authoring the webpage as opposed to run-time, in some embodiments. The template 308 and controls files 310 are HTML files in some embodiments.

The TC generates a webpage 316 and outputs the webpage 316 to the web application 318. The webpage 316 is an HTML page in various embodiments. The HTML page is a page that that the client downloads when the user tries to run the web application 318.

Figure 4A:
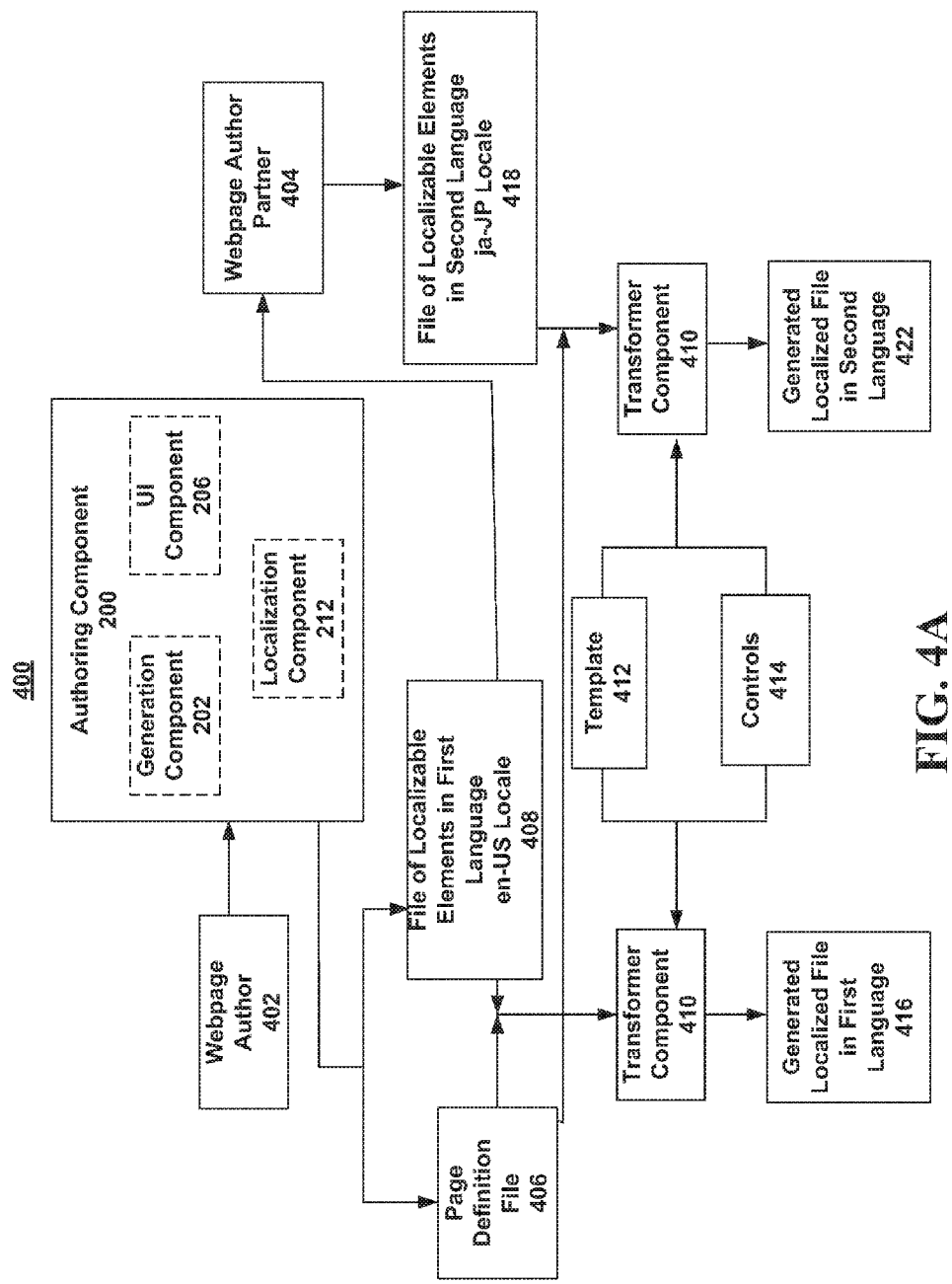

FIG. 4A is a diagram illustrating exemplary flows that facilitate localization of elements of a UI in accordance with embodiments described herein. The localization is performed by the localization component 212 of FIG. 2. As shown in FIG. 4A, the AC 200 receives an input from the webpage author 402. In various alternative embodiments, the webpage author 402 is any entity, human or machine, able to provide inputs to the AC 200.

The inputs are metadata associated with a webpage of a web application. For example, the metadata is provided via a page definition file 406. In this case, the page definition file 406 includes metadata described with reference to FIG. 2.

In some embodiments, the input to the AC 200 also includes strings in a first language that can be interpreted and/or processed by the AC 200. For example, in one embodiment, the strings are English language strings.

The inputs represent localizable elements of the webpage and non-localizable elements of the webpage. The localization component 212 of the AC 200 identifies the localizable elements. The file 408 includes the localizable elements in the English language in some embodiments. In other embodiments, the file 408 includes the localizable elements in any language that can be processed by the localization component 212 of the authoring tool 200.

Referring back to FIG. 4A, upon identifying the localizable elements, the localization component 212 stores the localizable elements of the webpage in a first file 408 and stores the non-localizable elements in a second file.

The authoring tool outputs the file of localizable elements in the first language 408 to the webpage author partner 404. In alternative embodiments, the webpage author partner 404 can be any entity, human or machine, able to read the file of localizable elements in the first language 408, convert the localizable elements to a second language and control the output of the file of localizable elements to a second language.

In some embodiments, the webpage author 402 or a webpage author partner 404 adapt the localized elements in the first file 408 into a language associated with a second locale. The first file 408 includes metadata in various embodiments. As shown in FIG. 4A, the localizable elements are adapted into the Japanese language and output from the webpage author partner 404 as a second file of localizable elements in a second language. In other embodiments, the file is adapted into any number of different languages.

In the embodiments shown, the first file of localizable elements in the English language are adapted into a file 418 of localizable elements represented in the Japanese language. Both the file of localizable elements and the adapted file of localizable elements are in the same format in various embodiments. For example, as shown in FIG. 4A, both the file of localizable elements and the adapted file of localizable elements can be XML files.

In embodiments wherein the localizable elements have been adapted into a second language, the file 418 of localizable elements in the second language and the page definition file for the webpage 406 can be input to a transformer component (TC) 410. The TC 410 can have or more functions described above with reference to TC 104.

The TC 410 merges the file 418 of localizable elements in the second language with the webpage templates 412 and webpage controls 414 for the webpage for which the localizable elements are gleaned. As such, merging is performed at the time of authoring the webpage as opposed to run-time, in some embodiments. In various embodiments, the templates 412 and/or webpage controls 414 are in any number of languages, including, but not limited to, HTML. In some embodiments, the metadata describing the webpage templates 412 and/or the webpage controls 414 are provided in the page definition file 406 for the webpage, as described with reference to FIG. 2. The webpage templates can be in HTML and/or Cascading Style Sheets (CSS) in various embodiments.

The TC 410 generates a localized file 422 (e.g., a file having localizable elements that are translated into a second language). In one embodiment, the localized file 422 is in the same language as the language in which the templates and/or controls are displayed. The templates and/or controls are also localizable in some embodiments.

In various embodiments, while templates are employed to provide the elements that are edited by the content authors, in some embodiments, the TC 410 forgoes the use of templates and provides the content authors editing power over the entire appearance of the webpage.

The localized file 422 output from the TC 410 is downloaded to, and consumed by, a client web application (not shown). If desired, the localized file 422 is populated with additional data from the internet at run-time via web services.

In embodiments wherein the localizable elements have not been adapted into a second language, and are in the original first language, as described above, the file 408 of localizable elements in the first language and the page definition file for the webpage 406 is input to a TC 410. The first file 408 includes metadata in various embodiments. While the authoring tool 200 is a web portal, in some embodiments, a server is configured to perform one or more functions of the TC 410 (in addition to other functions that the server may perform).

The TC 410 merges the file 408 of localizable elements in the first language with the webpage templates 412 and webpage controls 414 for the webpage for which the localizable elements are gleaned. In various alternative embodiments, the templates 412 and/or webpage controls 414 are in any number of languages, including, but not limited to, HTML. In some embodiments, the metadata describing the webpage templates 412 and/or the webpage controls 414 is provided in the page definition file 406 for the webpage, as described with reference to FIG. 2. The webpage templates can be in HTML and/or CSS in various embodiments. In various embodiments, the templates and/or controls are updateable.

The TC 410 generates a localized file 416 (e.g., a file having localizable elements that are translated into a second language). The localized file 416 can be in the same language as the templates and/or controls, including, but not limited to, HTML.

The localized file 416 is then downloaded to, and consumed by, a client web application (not shown). If desired, the localized file 416 is populated with additional data from the internet at run-time via web services.

Figure 4B:
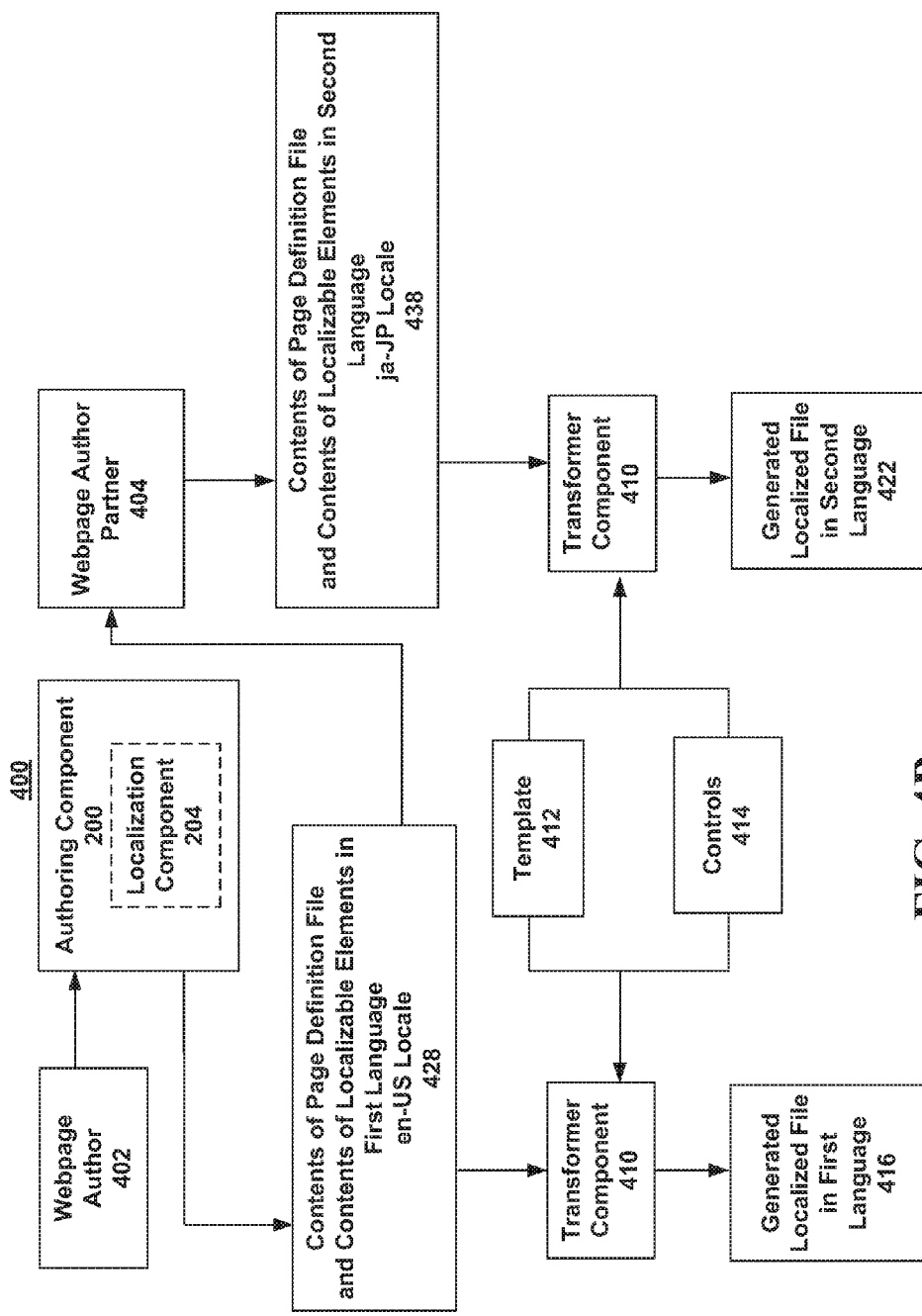

In some embodiments, in lieu of outputting a file as described with reference to FIGS. 4A and 4B, the AC 200 outputs a UI having editable fields such as that shown at FIG. 5. As shown in FIG. 5, fields 502, 504, 506, 508 and 510, which include text, are editable while image 514 (which does not include any elements of text) and the WINDOWS LIVE® trademark 512 (which is intellectual property) are not editable. As such, the display region 500 illustrates text boxes or other indicators informing the external editor that localized text can be input. In one embodiment, the localized text that is input is a translation into a second language of text initially provided in a first language.

In various embodiments, the TC 410 includes a validation component (not shown) that validates the parameters in the page definition file 406 prior to merging. In some embodiments, the authoring tool 200 performs a first round of validation of the page definition file 406 with the validation component 204 and the TC 410 performs a second round of validation of the parameters of the page definition file.

While the TC 410 is described as being the same component for merging file 408 with the templates and controls and for merging file 418 with templates and controls, the TC 410 need not have the structure and/or functionality to provide both functions. In embodiments, TC 410 is a first component for merging file 408 with templates and controls and a second component for merging file 418 with templates and controls. Merging is performed at the time of authoring the webpage as opposed to run-time, in some embodiments.

Additionally, while the flow diagram 400 is described with reference to HTML, CSS and/or XML, different languages for programming and providing web applications (or webpages associated therewith) are employed in various embodiments.

While the embodiments above describe cases wherein the page definition file and the file of localizable elements are distinct from one another, in various embodiments (as shown below), and in FIG. 4B, the authoring component 200 outputs a single page definition file 428 that includes metadata for the localizable elements of the webpage in a first language. The file 428 also specifies which topic page or application is to appear in the specified control, including the feature name and/or image, in some embodiments.

An example page definition file, ABCPageDef, is shown below. Information indicating localizable elements of the webpage are shown in the page definition file. Such page definition file, as described above, includes metadata for identifying localizable elements of a webpage.

As shown in the page definition file above, the metadata includes information indicating localizable elements (e.g., the text strings "Hello", "Fall Back to school" and "Tetris"). As shown, the locale is the United States (indicated as "en-US") and therefore the text strings are in English. Such information can be localized to French as shown above with the locale indicator as "fr-FR" (indicating France) and the localized text strings shown in French as "Bonjour", "Ecole" and "Té triste". Images are specified, the template, "Tetris" is also indicated, and controls information ("CategoryThreeFeatures") is also indicated.

The page definition file provided above is merely exemplary and only one non-limiting embodiment. Other page definition files (that include other metadata) are provided in varying embodiments. For example, in some embodiments, the metadata describes information indicating the applications (or lists of applications) to be displayed via the webpage. For example, in some embodiments, the webpage is a webpage for a store feature providing online goods and/or services. In one non-limiting embodiment, the web application is an online store for selling any number of different goods including, but not limited to, web applications, tools, software and the like.

An example schema for the page definition file provided above is as follows.

ABCPageDef—A top-level node in the XML file that contains the following parameters in one embodiment:
partner=ID value corresponding to Microsoft or the external channel partner who created the file

```
<?xml version="1.0"?>
<!-- File generated by Windows 8 Channel Partner Portal -->
<ABCPageDef version="6.1" country="US" partner="1" machineclass="0" page="cat-games" >
    <Template id="Rainier">
    <FeatureControl type="CategoryThreeFeatures" container="1" >
    <Feature>
    <FeatureContent type="topic" id="{6F7254C8-C9C1-4DFE-B88C-92DE49986E84}" title="##S1##" image="##I1##" />
        <!-The second FeatureContent can be a fallback feature to show in case the first feature is filtered out for any reason -->
    <FeatureContent type="app" id="{C8228A86-ED42-4434-AAA9-92362EC00693}" title="##S2##" image="##I2##"/>
    </Feature>
    <Featur>
    <FeatureContent type="topic" id="F1BA2B58-33B5-4AD0-A624-8C676239DAB0" title="##S3##" image="##I3##" />
    </feature>
    <!-- Additional <Feature> elements for the control -->
    </FeatureControl>
    <!-- Additional <FeatureControl> elements ...-->
    <List container="2" id="5" />
    <List container="3" id="8" />
    </Template>
    <Locale name="en-US">
    <string id="1">Hello</string>
    <string id="2">Fall Back to school</string>
    <string id="3">Tetris</string>
    <!-- <image> element content is relative image path -->
    <image id="1">images/features/Dell/en-US/toystory.524x316.png</image>
    <image id="2">images/apps/Dell/en-US/wordpad.524x316.png</image>
    <image id="3">images/features/Dell/en-US/tetris.524x316.png</image>
    </Locale>
    <Locale name="fr-FR">
    <string id="1">Bonjour</string>
    <string id="2">Ecole</string>
    <string id="3">Te triste</string>
    <image id="1">images/features/Dell/fr-FR/toystory.524x316.png</image>
    <image id="2">images/apps/Dell/fr-FR/wordpad.524x316.png</image>
    <image id="3">images/features/Dell/fr-FR/tetris.524x316.png</image
    </Locale>
</ABCPageDef>
``` version=represents the page definition schema version
page=specifies the store page (e.g., "home," "cat-games," "cat-media," "cat-life")
county=specifies the store country/market (e.g., US, Canada, Japan)
machineclass=specifies the type or capabilities of the machine such as "laptop," "touch," "non-touch" and "tablet". These can be numerical values instead of strings.
Template—A node with an ABCPageDef parent node that identifies a filename of a template to be displayed on a webpage, and containing the following parameter:
id=name of the template file
FeatureControl and Feature—One or more nodes which can directly map to the containers in the specified template. Each feature control contains one or more Feature nodes, corresponding to the number of features shown in the control. In one embodiment, the feature is an aspect or capability of a control.
FeatureContent—One or more nodes that specifies the application or topic page to show when the corresponding portion of the webpage is clicked or otherwise activated.
type="app" or "topic"
id=guide of the application identification (ID) or topic page ID
title=caption of the control; this is a "##Sx##" placeholder, which is replaced by a localized string by the Transformer Component
image=relative universal resource locator (URL) of an image to show in the control; this is a "##Ix##" placeholder, which is replaced by the uniform resource locator (URL) of the localized image by the Transformer Component
List—One or more List node is specified which specifies the order and identifier in which the lists of applications are to appear in the webpage.
container=ID which references an element in the template that will hold the list
id=value corresponding to a known set of data-generated lists
Locale—One or more Locale nodes specify in which languages the Transformer Component is to generate the webpages. The string and image nodes correspond to the above-referenced "##Sx##" and "##Ix##" placeholders, respectively, in the ABCPageDef node.

Similar to that described with reference to FIG. 4A, in one embodiment, the TC 410 merges the contents of the page definition file and the contents of the localizable elements in the first language 428 with the webpage templates 412 and webpage controls 414 for the webpage for which the localizable elements are gleaned. The TC 410 then generates a localized file 416 (e.g., a file having localizable elements that are adapted into a second language). The localized file 416 is formatted in the same language as the templates and/or controls, including, but not limited to, HTML, in some embodiments.

The localized file 416 can be downloaded to, and consumed by, a client web application (not shown). If desired, the localized file 416 is populated with additional data from the internet at run-time via web services.

Similar to that described with reference to FIG. 4A, in one embodiment, the TC 410 merges the file 438 of the contents of the page definition file and the contents of the localizable elements in the second language with the webpage templates 412 and webpage controls 414 for the webpage for which the localizable elements are gleaned. The TC 410 then generates a localized file 416 (e.g., a file having localizable elements that are adapted into a second language). The localized file 416 is in the same language as the templates and/or controls, including, but not limited to, HTML, in some embodiments.

As described herein, the embodiments herein are distinct from conventional systems in a number of ways. For example, embodiments herein provide frameworks for editing web applications and/or provide systems and methods for automatically identifying localizable elements of a webpage to enable efficient localization of the localizable elements into a different language from the language in which the webpage was initially provided. These capabilities can be provided for web-based computer code, including, but not limited to, HTML and CSS.

In one embodiment, the TC 410 receives the localized content, inserts the localized content into placeholders of an HTML page or CSS file, and/or generates the merged localized file with templates and controls for use by web applications on a client machine. In various embodiments, placeholders are created to identify the localizable elements of webpages for UIs, and place these elements in a file that is incorporated into the main page source code for the webpage. As used herein, placeholders are replaced by the uniform resource locator (URL) of the localized content by the TC 410.

In these embodiments, external editors (e.g., developers other than those developers that originally developed the web application prior to OS release) choose different templates and controls or localize content while authoring only the localizable elements of the webpage of the UI.

In some embodiments, the embodiments described are extensible to webpage styling, branding and/or advertisement information, and/or enable utilizing of lists of applications as compared to mere text, such as help text and other types of text.

In some embodiments, the embodiments described herein include an external web portal for external editors to provide inputs to the AC (not shown) and to receive outputs from the TC (not shown). In some embodiments, web services are employed to dynamically insert updated (localized) content on webpages on the client.

In some embodiments, the systems and/or methods described herein employ any number of template-based UIs that use webpages including, but not limited to, web applications. In various embodiments, the web applications include an online marketplace, or online store, application.

In various embodiments, the web application is an application offered to third-party software developers. As such, embodiments described herein enables third-party software developers the capability to localize various elements of the webpages for the UT thus customizing such applications for different locales around the world.

In some embodiments, the metadata is provided to a company through email and not a website. The strings and image files and any other data are provided via email instead of provided at a website and can be provided back via email.

Figure 6:
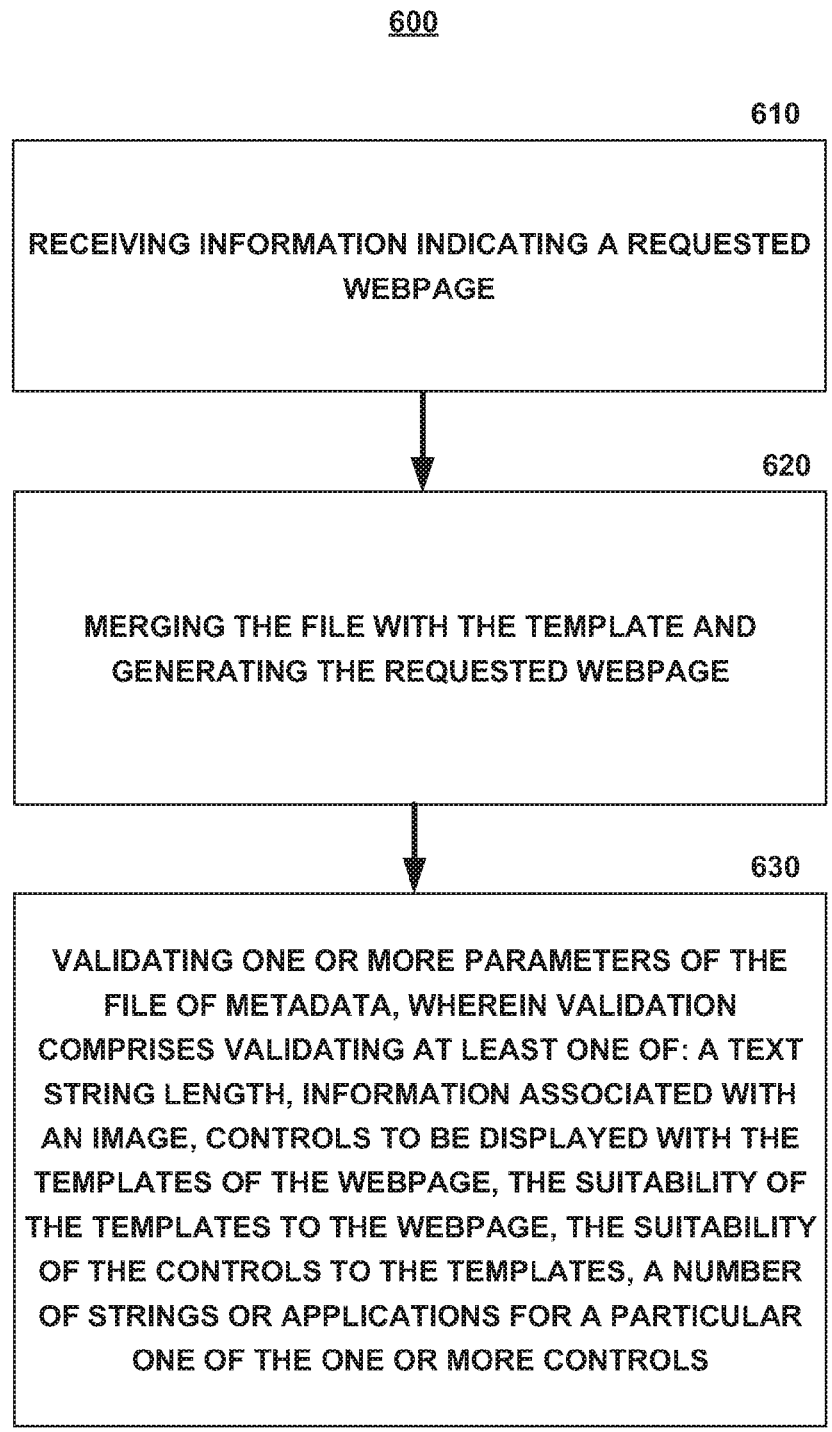
FIGS. 6, 7 and 8 are flow charts illustrating exemplary non-limiting methods facilitating web application modification in accordance with various aspects and embodiments described herein.

FIG. 6 is a flowchart of an embodiment for facilitating modification of webpage in accordance with embodiments described herein. At 610, method 600 includes receiving information indicating a requested webpage. In one embodiment, the information is a file including metadata describing a requested webpage and specifying a template for the requested webpage, and one or more controls to display with the template. The metadata describes applications for display on the requested webpage and/or branding or advertising corresponding to the applications. At least one of the applications is an online marketplace in some embodiments.

At 620, method 600 includes merging the file with the template and generating the requested webpage. In one embodiment, merging is performed via a server, and the merged file is then downloaded to a client.

At 630, method 600 includes validating one or more parameters of the file of metadata, wherein validation comprises validating at least one of: a text string length, information associated with an image, controls to be displayed with the templates of the webpage, the suitability of the templates to the webpage, the suitability of the controls to the templates, a number of strings or applications for a particular one of the one or more controls.

In some embodiments, the information associated with the image comprises at least one of whether the image is black and white or a color image, a type of the image, a content of the image, a size of the image.

In some embodiments, method 600 also includes identifying (not shown) localizable elements of the requested webpage, and outputting information indicating the localizable elements via a web portal. For example, the text strings or images containing text can be identified and the metadata corresponding to the text strings and the text contained in the images as the localizable elements can be identified.

Figure 7:
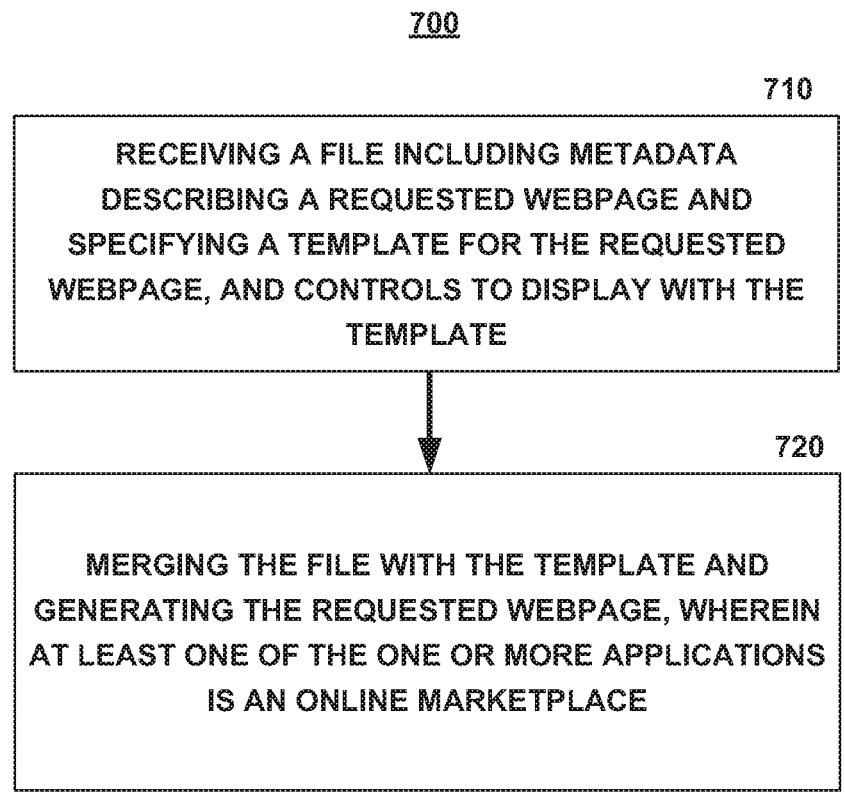

FIG. 7 is a flowchart of an embodiment for facilitating modification of webpage in accordance with embodiments described herein. At 710, method 700 includes receiving a file including metadata describing a requested webpage and specifying a template for the requested webpage, and controls to display with the template. The metadata also describes applications for display on the requested webpage and branding or advertising corresponding to the applications. At 720, method 700 includes merging the file with the template and generating the requested webpage, wherein at least one of the one or more applications is an online marketplace.

Figure 8:
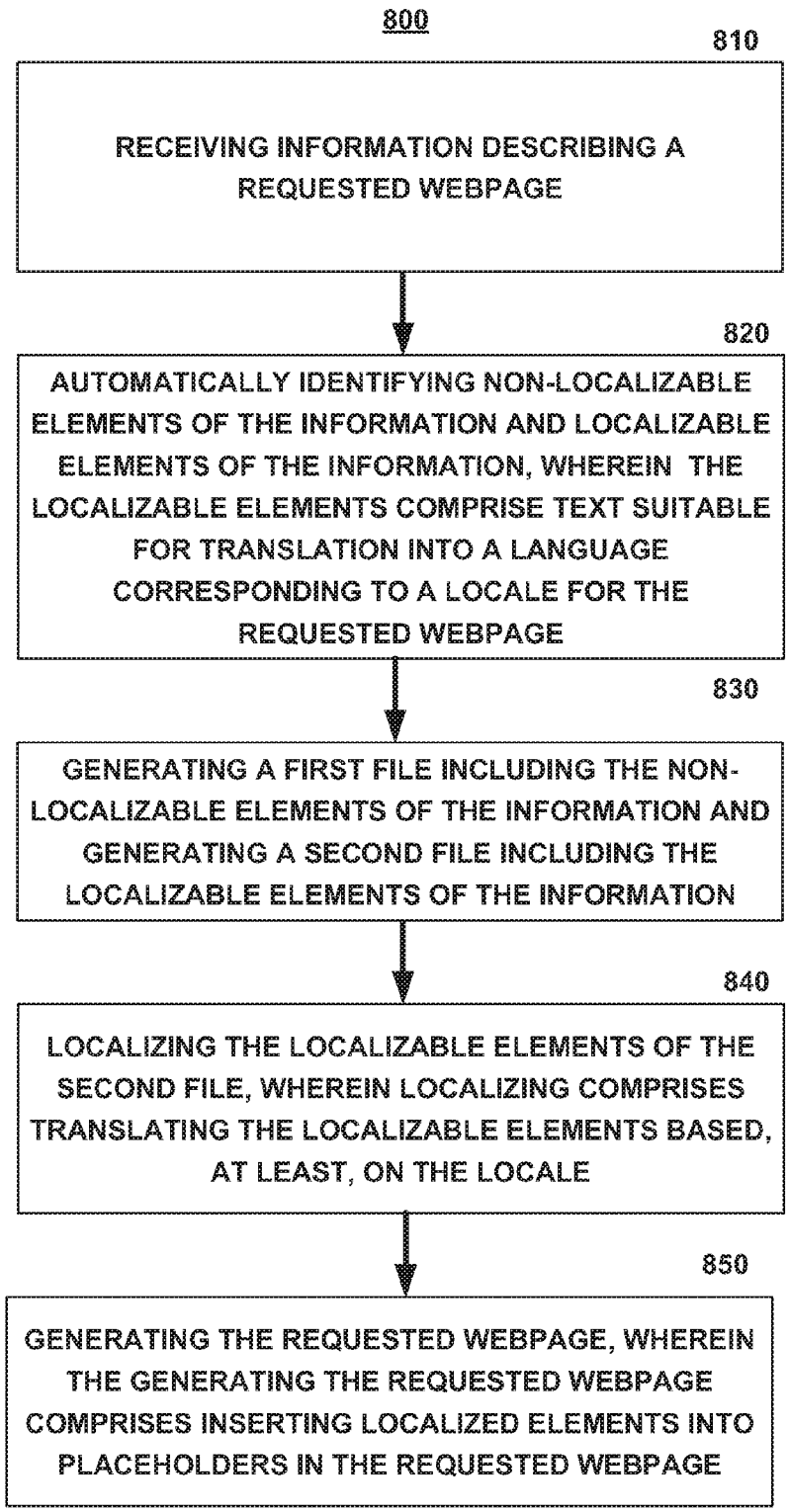

FIG. 8 is a flowchart of an embodiment for facilitating modification of webpage in accordance with embodiments described herein. At 810, method 800 includes receiving information describing a requested webpage. At 820, method 800 includes automatically identifying non-localizable elements of the information and localizable elements of the information. In one embodiment, for example, the localizable elements are text suitable for translation into a language corresponding to a locale for the requested webpage. In some embodiments, the identification process comprises: determining whether elements of the requested webpage are indicating text strings or images containing text; and identifying the elements of the requested webpage that are indicating the text strings of text contained in the images as the localizable elements of the requested webpage.

At 830, method 800 includes generating a first file including the non-localizable elements of the information and generating a second file including the localizable elements of the information.

At 840, method 800 includes localizing the localizable elements of the second file. Localizing includes translating the localizable elements based, at least, on the locale. At 850, method 800 includes generating the requested webpage, wherein the generating the requested webpage comprises inserting localized elements into placeholders in the requested webpage.

Figure 9:
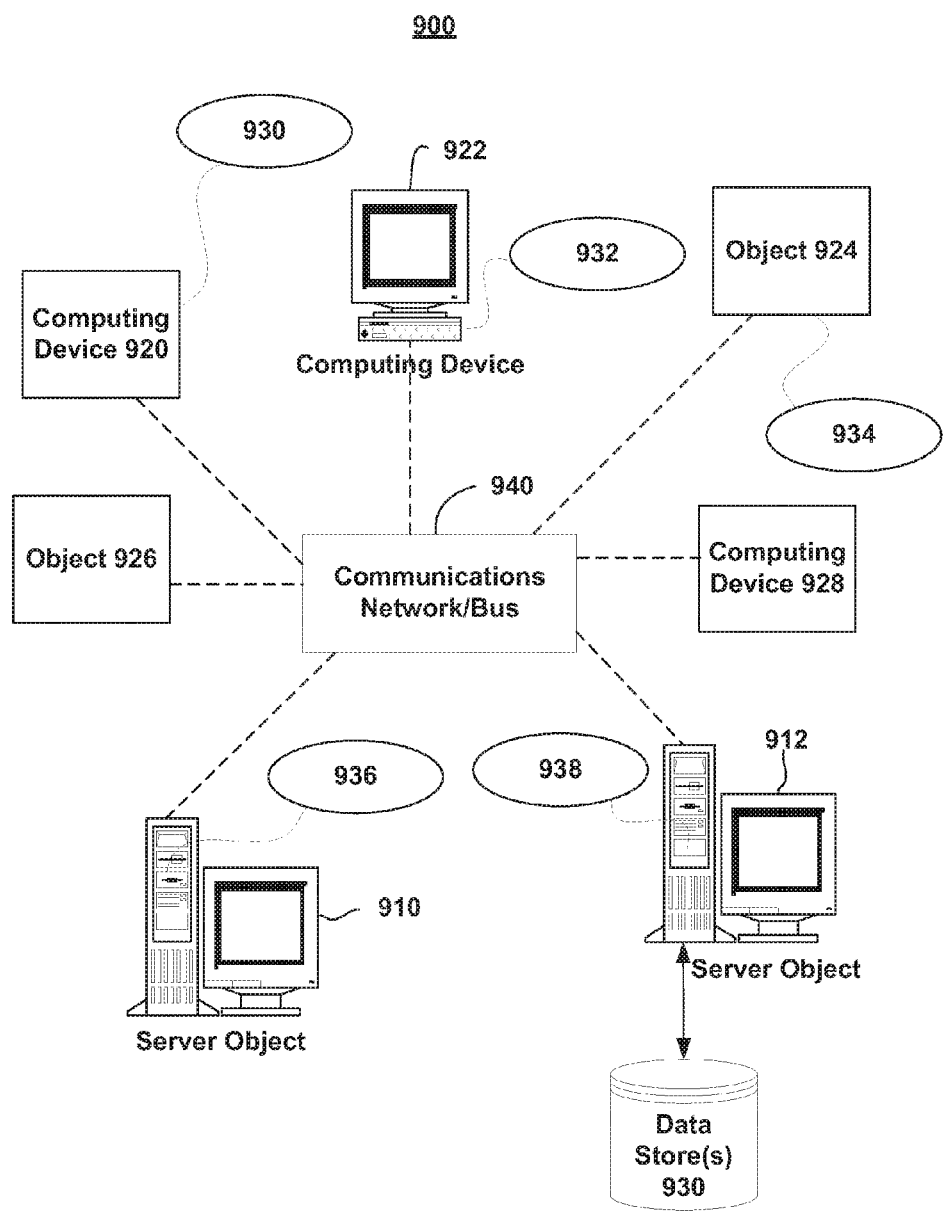
FIG. 9 is a block diagram illustrating an exemplary non-limiting networked environment in which various embodiments described herein can be implemented.

FIG. 9 provides a non-limiting schematic diagram of an exemplary networked or distributed computing environment. One of ordinary skill in the art can appreciate that the various embodiments of methods, systems and apparatus described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Referring to FIG. 9, the distributed computing environment comprises server objects 910, 912. The distributed computing environment also comprises computing objects or computing devices 920, 922, 924, 926, 928, which can include, but are not limited to, programs, methods, data stores, programmable logic, etc., as represented by applications 930, 932, 934, 936, 938. It can be appreciated that computing objects or computing devices 920, 922, 924, 926, 928, etc. can be included in different devices, such as personal digital assistants (PDAs), digital video disks (DVDs), compact discs (CDs), audio/video devices, mobile phones, Moving Picture Experts Group Audio Layer III (MP3) players, laptops, etc.

Each server object 910, 912, etc. and computing objects or devices 920, 922, 924, 926, 928, etc. can communicate with one or more other server objects 910, 912, etc. and computing objects or computing devices 920, 922, 924, 926, 928, etc. by way of the communications network 940, either directly or indirectly. Even though illustrated as a single element in FIG. 9, network 940 can comprise other computing objects and computing devices that provide services to the system of FIG. 9, and/or can represent multiple interconnected networks, which are not shown. Each object 910, 912, etc. or computing objects or devices 920, 922, 924, 926, 928, etc. can also contain an application, such as applications 930, 932, 934, 936, 938, that might make use of an API, or other object, software, firmware and/or hardware, suitable for communication with or implementation of an infrastructure for information as a service from any platform as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 9, as a non-limiting example, computing objects or devices 920, 922, 924, 926, 928, etc. can be thought of as clients and objects 910, 912, etc. can be thought of as servers where servers, etc. provide data services, such as receiving data from client computing objects or devices 920, 922, 924, 926, 928, etc., storing of data, processing of data, transmitting data to client computing objects or devices 920, 922, 924, 926, 928, etc., although any computer can be considered a client, a server, or both, depending on the circumstances. Any of these computing devices can be processing data, or requesting services or tasks that can implicate an infrastructure for information as a service from any platform and related techniques as described herein for one or more embodiments.

A server is typically a computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server.

In a network environment in which the communications network/bus 940 is the Internet, for example, the servers etc. can be Web servers with which the client computing objects or devices 920, 922, 924, 926, 928, etc. communicate via any of a number of known protocols, such as Hypertext Transfer Protocol (HTTP). Servers etc. can also serve as client computing objects or devices 920, 922, 924, 926, 928, etc., as can be characteristic of a distributed computing environment.

Figure 10:
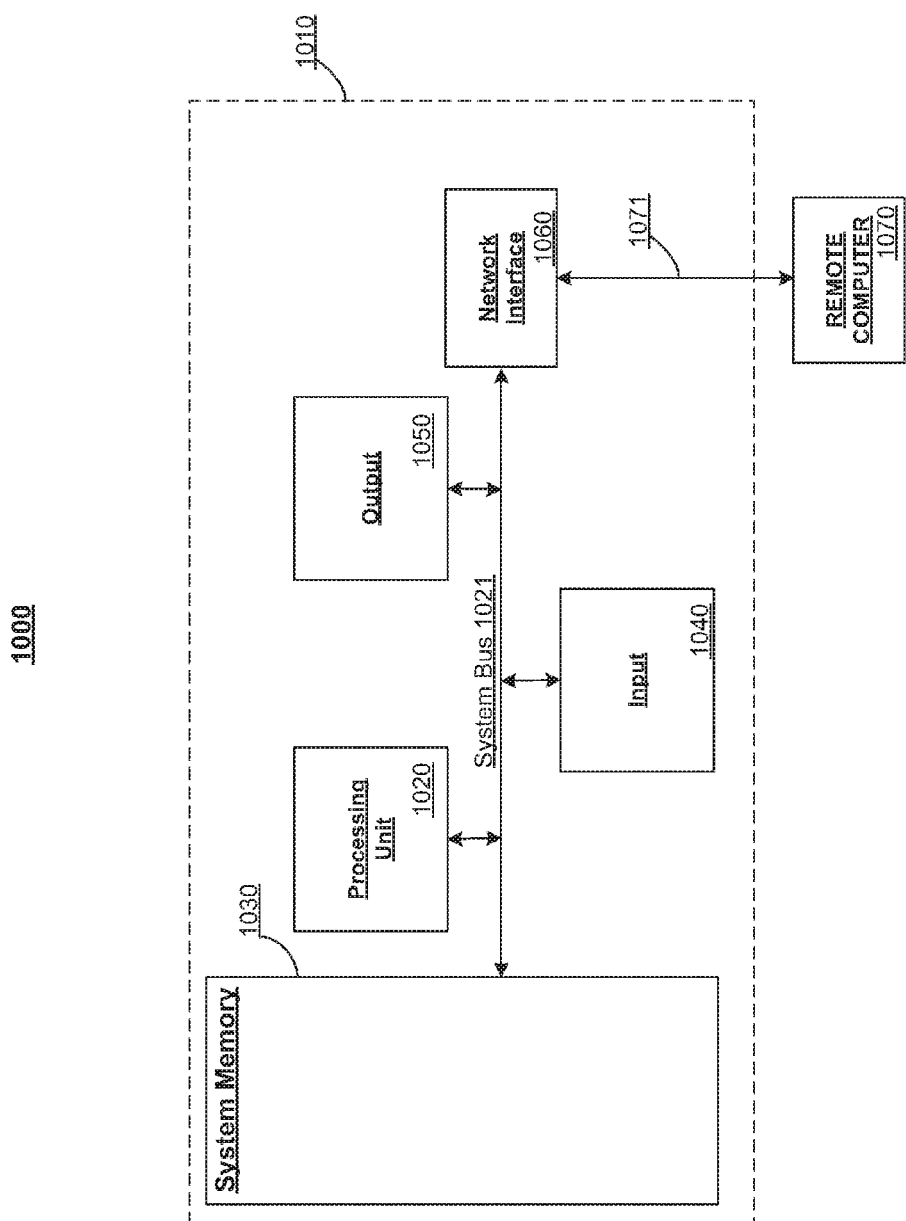
FIG. 10 is a block diagram illustrating an exemplary non-limiting computing system or operating environment in which one or more aspects of various embodiments described herein can be implemented.

FIG. 10 illustrates one example of a suitable computing system environment 1000 in which one or more of the embodiments can be implemented. As mentioned, various embodiments described herein apply to any device wherein it is desirable to implement one or pieces of a framework for the embodiments described herein. Although not required, any of the embodiments can partly be implemented via an operating system, for use by a developer of services for a device or object, and/or included within application software that operates in connection with the operable component(s). Software can be described in the general context of computer-executable instructions, such as program components, being executed by one or more computers, such as client workstations, servers or other devices.

Referring to FIG. 10, an exemplary remote device for implementing one or more embodiments herein can include a general purpose computing device in the form of a handheld computer 1010. Components of handheld computer 1010 can include, but are not limited to, a processing unit 1020, a system memory 1030, and a system bus 1021 that couples various system components including the system memory to the processing unit 1020.

As it employed in the subject specification, the term "processing unit" or "processor" can refer to substantially any computing processing unit or device comprising, but not limited to comprising, single-core processors; single-processors with software multithread execution capability; multi-core processors; multi-core processors with software multi-thread execution capability; multi-core processors with hardware multithread technology; parallel platforms; parallel platforms with distributed shared memory; virtual processors or processors made of software, that can operate on hardware. Additionally, a processing unit or processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processing units or processors can exploit nano-scale architectures such as, but not limited to, molecular and quantum-dot based transistors, switches and gates, in order to optimize space usage or enhance performance of user equipment. A processing unit or processor can also be implemented as a combination of computing processing units.

Computer 1010 typically includes a variety of computer-readable media and/or computer-readable storage media, either of which can be any available media that can be accessed by computer 1010. Computer-readable media can be any suitable media that can be accessed by the computer and includes both volatile and non-volatile media, removable and non-removable media, and can be implemented in any method or technology for storage of information such as computer-readable instructions, data structures, program modules or other data. Computer-readable storage media includes, but is not limited to, read-only memory (ROM), random access memory (RAM), Electrically Erasable Programmable Read-Only Memory (EEPROM), flash memory or other memory technology, compact disc read-only memory (CD-ROM), digital versatile disk (DVD) or other optical disk storage, magnetic cassettes, magnetic tape, magnetic disk storage or other magnetic storage devices, or other tangible and/or non-transitory media which can be used to store desired information and which can be accessed by one or more computing devices, or other storage devices. Combinations of any of the above are also included within the scope of computer-readable media.

By way of example, but not limitation, memory 1030 can also include an operating system, application programs, other program components, and program data. In the subject specification, terms such as "data store," data storage," "database," "repository", and substantially any other information storage component relevant to operation and functionality of a component, refer to "memory components," or entities embodied in a "memory" or components comprising the memory.

A user can input commands and information into the computer 1010 through input 1040. Input 1040 can be any input device. An output 1050, or monitor, or other type of display device is also connected to the system bus 1021 via an interface, such as network interface 1060. In addition to a monitor, computers can also include other peripheral output devices such as speakers and a printer, which can be connected through output interface 1050.

The computer 1010 can operate in a networked or distributed environment using logical connections to one or more other remote computers, such as remote computer 1070. The remote computer 1070 can be a personal computer, a server, a router, a network PC, a peer device or other common network node, or any other remote media consumption or transmission device, and can include any or all of the elements described above relative to the computer 1010. The logical connections depicted in FIG. 10 include a network 1071, such local area network (LAN) or a wide area network (WAN), but can also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts can be applied to any network system and any computing device or system in which it is desirable to augment reality via a secondary channel.

There are multiple ways of implementing one or more of the embodiments described herein, e.g., an appropriate API, tool kit, driver code, operating system, control, standalone or downloadable software object, etc. which enables applications and services to use a framework for augmenting reality via a secondary channel. Embodiments can be contemplated from the standpoint of an API (or other software object), as well as from a software or hardware object that provides pointing platform services in accordance with one or more of the described embodiments. Various implementations and embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As used herein, the terms "infer" or "inference" refer generally to the process of reasoning about or inferring states of the system, apparatus, method, environment, and/or user from a set of observations as captured via events and/or data. By way of examples, but not limitation, inference can be employed to identify a specific context or action, or can generate a probability distribution over states. The inference can be probabilistic (e.g., the computation of a probability distribution over states of interest based on a consideration of data and events). Inference can also refer to techniques employed for composing higher-level events from a set of events and/or data. Such inference can result in the construction of new events or actions from a set of observed events and/or stored event data, whether or not the events are correlated in close temporal proximity, and whether the events and data come from one or several event and data sources.

Furthermore, the embodiments can be implemented as a method, apparatus or article of manufacture using standard programming and/or engineering techniques to produce software, firmware, hardware, or any combination thereof to control a computer, apparatus or article of manufacture to implement the functionality disclosed herein. The term "article of manufacture," as used herein, is intended to encompass a computer program, or computer program product, accessible from any computer-readable device, computer-readable carrier, computer-readable media or computer-readable storage media.

As mentioned, the various techniques described herein can be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on computer and the computer can be a component. One or more components can reside within a process and/or thread of execution and a component can be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but generally known by those of skill in the art.

In view of the exemplary systems described supra, methodologies that can be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks can occur in different orders and/or concurrently with other blocks from what is depicted and described herein. Where non-sequential, or branched, flow is illustrated via flowchart, it can be appreciated that various other branches, flow paths, and orders of the blocks, can be implemented which achieve the same or a similar result. Moreover, not all illustrated blocks are needed to implement the methodologies described hereinafter.

While in some embodiments, a client side perspective is illustrated, it is to be understood for the avoidance of doubt that a corresponding server perspective exists, or vice versa. Similarly, where a method is practiced, a corresponding device can be provided having storage and at least one processor configured to practice that method via one or more components.

While the various embodiments have been described in connection with various embodiments of the various figures, it is to be understood that other similar embodiments can be used or modifications and additions can be made to the described embodiment for performing the same function without deviating therefrom. Still further, one or more aspects of the above described embodiments can be implemented in or across a plurality of processing chips or devices, and storage can similarly be affected across a plurality of devices. Therefore, the present invention is not to be limited to any single embodiment, but rather is to be construed in breadth and scope in accordance with the appended claims.

Further, what has been described above includes embodiments of claimed subject matter. It is, of course, not possible to describe every conceivable combination of components or methodologies for purposes of describing the claimed subject matter. However, one of ordinary skill in the art can recognize that many further combinations and permutations of such subject matter are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method performed on at least one computing device, the method comprising:

receiving, by the at least one computing device in response to a request for a webpage, information that describes the requested webpage and a localizable element of the requested webpage, and upon receiving the localizable element, storing the localizable element in a first file and storing non-localizable elements in a second file;

translating, by the at least one computing device based on a desired locale for the requested webpage, the localizable element from a first human language that does not correspond to the desired locale to a second human language that does correspond to the desired locale; and generating, by the at least one computing device based on the received information and the translated localizable element, the requested webpage by inserting the translated localized element into a main page source code for the requested webpage, whereby the generated webpage includes the translated localizable element instead of the localizable element, the localizable element being adapted into the translated localized element and stored with a page definition file for the webpage that is merged with one of webpage templates or webpage controls for the webpage.

2. The method of claim 1 where the localizable element comprises text.

3. The method of claim 1 where the localizable element comprises an image with text.

4. The method of claim 1 where the method is performed at a time of authoring the webpage as opposed to run-time.

5. The method of claim 1 where the information identifies the localizable element as an element of the webpage that can be localized, wherein the first and second files are in a same format.

6. The method of claim 1 where the information identifies other localizable elements as elements of the webpage that can be localized and further comprising generating a localized file output that is configured to be downloaded and consumed by a client web application, wherein the localized file output is populated with additional data from the Internet at run-time via one or more web services.

7. The method of claim 1 further comprising automatically identifying, by the at least one computing device based on the received information, the localizable element as an element of the webpage that can be localized.

8. A system comprising:

at least one computing device;

memory that is coupled to the at least one computing device and that includes computer-executable instructions that, based on execution by the at least one computing device, configure the system to perform actions comprising:

receiving, by the at least one computing device in response to a request for a webpage, information that describes the requested webpage and a localizable element of the requested webpage, and upon receiving the localizable element, storing the localizable element in a first file and storing non-localizable elements in a second file;

translating, by the at least one computing device based on a desired locale for the requested webpage, the localizable element from a first human language that does not correspond to the desired locale to a second human language that does correspond to the desired locale; and generating, by the at least one computing device based on the received information and the translated localizable element, the requested webpage by inserting the translated localized element into a main page source code for the requested webpage, whereby the generated webpage includes the translated localizable element instead of the localizable element, the localizable element being adapted into the translated localized element and stored with a page definition file for the webpage that is merged with one of webpage templates or webpage controls for the webpage.

9. The system of claim 8 where the localizable element comprises text.

10. The system of claim 8 where the localizable element comprises an image with text.

11. The system of claim 8 where the method is performed at a time of authoring the webpage as opposed to run-time.

12. The system of claim 8 where the information identifies the localizable element as an element of the webpage that can be localized.

13. The system of claim 8 where the information identifies other localizable elements as elements of the webpage that can be localized.

14. The system of claim 8, the actions further comprising automatically identifying, by the at least one computing device based on the received information, the localizable element as an element of the webpage that can be localized.

15. At least one hardware computer-readable storage medium that includes computer-executable instructions that, based on execution by at least one computing device, configure the at least one computing device to perform actions comprising:

receiving, by the at least one computing device in response to a request for a webpage, information that describes the requested webpage and a localizable element of the requested webpage, and upon receiving the localizable element, storing the localizable element in a first file and storing non-localizable elements in a second file;

translating, by the at least one computing device based on a desired locale for the requested webpage, the localizable element from a first human language that does not correspond to the desired locale to a second human language that does correspond to the desired locale; and generating, by the at least one computing device based on the received information and the translated localizable element, the requested webpage by inserting the translated localized element into a main page source code for the requested webpage, whereby the generated webpage includes the translated localizable element instead of the localizable element, the localizable element being adapted into the translated localized element and stored with a page definition file for the webpage that is merged with one of webpage templates or webpage controls for the webpage.

16. The at least one hardware computer-readable storage medium of claim 15 where the localizable element comprises text or an image with text.

17. The at least one hardware computer-readable storage medium of claim 15 where the method is performed at a time of authoring the webpage as opposed to run-time.

18. The at least one hardware computer-readable storage medium of claim 15 where the information identifies the localizable element as an element of the webpage that can be localized.

19. The at least one hardware computer-readable storage medium of claim 15 where the information identifies other localizable elements as elements of the webpage that can be localized.

20. The at least one hardware computer-readable storage medium of claim 15, the actions further comprising automatically identifying, by the at least one computing device based on the received information, the localizable element as an element of the webpage that can be localized.

* * * * *